W. J. ASHER.
NON-SKID CHAIN.
APPLICATION FILED FEB. 27, 1918.
1,302,496.
Patented May 6, 1919.
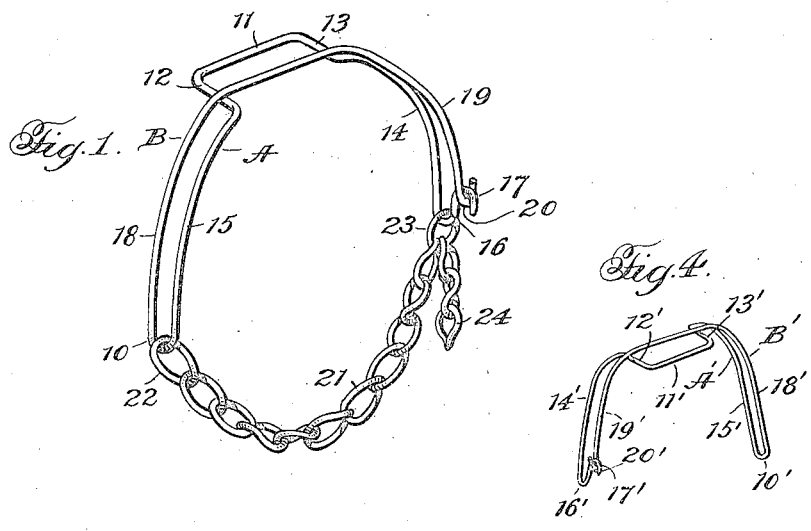
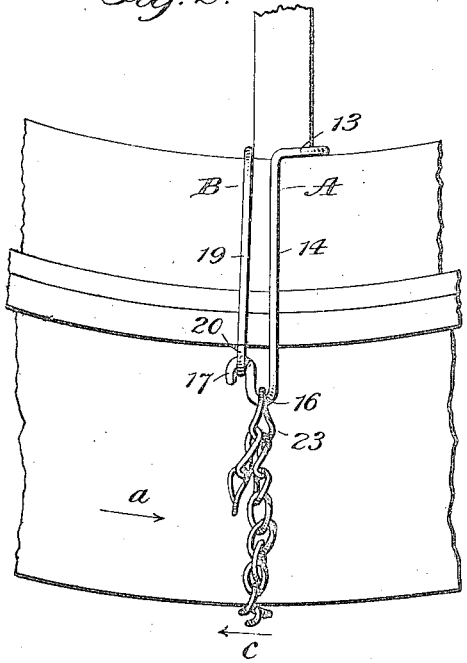
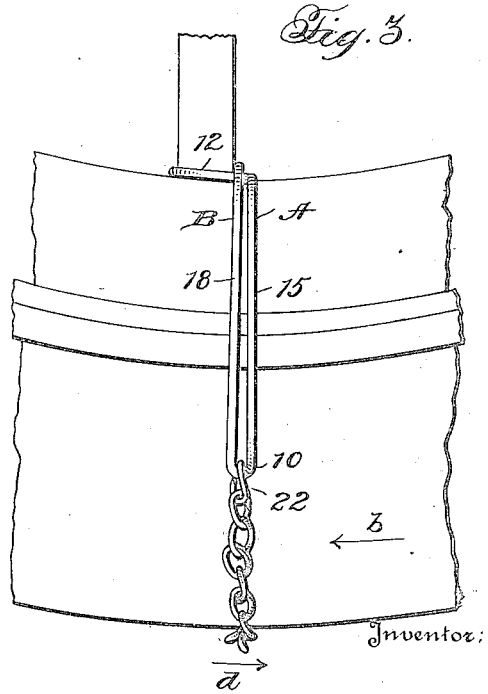
Inventor:
W. J. Asher
By Foster Freeman Watson & Coit
Attorneys

UNITED STATES PATENT OFFICE.

WILLIAM J. ASHER, OF NEWARK, NEW JERSEY.

NON-SKID CHAIN.

1,302,496.   Specification of Letters Patent.   Patented May 6, 1919.

Application filed February 27, 1918. Serial No. 219,427.

*To all whom it may concern:*

Be it known that I, WILLIAM J. ASHER, a citizen of the United States, and residing at Newark, county of Essex, State of New Jersey, have invented certain new and useful Improvements in Non-Skid Chains, of which the following is a specification.

The present invention relates to anti-skid devices and more particularly to such devices of the type comprising a length of chain adapted to be arranged transversely of the tread of the tire and means for securing the chain to the wheel.

The principal objects of the invention are to provide a device of the type mentioned having a substantially indestructible means for securing the chain to the wheel; to provide a securing means which is strong and yet has a minimum weight for the strength required, positively secures the chain against displacement circumferentially of the tire, is easily manipulated to put on and take off from the wheel and can be manufactured at a small cost; to provide an anti skid device constructed and arranged to secure the chain to the tire so that the position of the chain may be changed to bring a fresh or unworn portion at the tread of the wheel whereby the life of the chain is increased and to provide a device which is compact so that several may be carried in a small space. Other objects and features of novelty will be apparent from the description taken in connection with the drawings, in which, Figure 1 is a perspective view of an anti-skid device constructed in accordance with my invention;

Fig. 2 is a side elevation of a portion of a wheel and tire showing one of my anti-skid devices applied thereto;

Fig. 3 is a side elevation similar to Fig. 2, but showing the opposite side of the wheel; and Fig. 4 is a perspective view to a smaller scale illustrating a modification.

Referring to the drawings the anti-skid device of this invention as shown comprises a chain adapted to be arranged transversely of the tread of the tire, and means for attaching the chain in this position. This means consists of a small bar or wire bent on itself to form a bight 10 and two U-shaped members A and B adapted to straddle the felly of the wheel. One of these members as A has a portion located near the middle thereof bent out to form a spoke receiving offset 11. As shown the portion 12 forming one side of this offset is longer than the portion 13 forming the other, so that the leg 14 of the member A does not lie in the same transverse plane as the leg 15. Furthermore the leg 14 is shorter than the leg 15 for a purpose presently to be described. Near its end the leg 14 is bent back on itself to form a bight 16 and the end thereof is bent to form a hook 17. The member B is arranged so that it crosses the offset 11 adjacent the open side thereof. Furthermore, as clearly shown in Fig. 1, the leg 18 of member B is at the rear of the leg 15 of member A, and in crossing the offset 11 this member B is arranged so that the leg 19 thereof is positioned in front of the leg 14 of the member A. In other words, the leg 18 of member B is on one side of member A, and the leg 19 on the other side thereof. The leg 19 is shorter than the leg 18 and at the free end is bent to form a hook 20 adapted to coöperate with the hook 17 to detachably secure the free ends of legs 14 and 19 together. A chain 21 has an end link 22 mounted in the bight 10 and a link 23 in the bight 16. Preferably this latter link is not an end link but is removed a few links from the end of the chain, so that, as shown in Fig. 1, the chain has a loose end consisting of three or four links.

In applying one of my devices to a wheel, the hooks 17 and 20 are first disengaged and then the link 23 taken off the bight 16. Then the legs 14 and 19 are separated so that in putting the members on astraddle the felly, the spoke will pass between these two legs until it is opposite the offset 11, whereupon the spring action of the two members A and B moves the device so that the spoke is received in said offset and the device securely held against displacement, as member A is on one side of the spoke and member B on the other. The chain is now passed around the tread of the tire and the link 23 is placed in the bight 16 and the two hooks 17 and 20 caught together. Preferably the device is put on a wheel so that the member A with its spoke receiving offset is on the front side of the spoke relative to the direction in which the wheel is rotating. This relation of the parts is clearly illustrated in Figs. 2 and 3, where it will be observed that the member A is on the front side of the spoke relative to the direction of rotation as indicated by the arrows *a* and *b*.

It will be observed that the push of the chain on the ground tends to move the chain circumferentially on the tire in the direction indicated by the arrows *c* and *d* Figs. 2 and 3. Any movement in this direction tends to pull on the bight 16 of the securing means so that the hooks 17 and 20 are pulled in a direction to hold them together. Furthermore circumferential movement of the chain in the direction indicated by the arrows *c* and *d* is prevented because the member A of the securing means is on the opposite side of a spoke relative to such movement. Moreover any tendency of the members A and B to separate in a circumferential direction is prevented because the member B is arranged with one leg on one side of member A and the other leg on the other side. Thus if the chain should move slightly in the direction indicated by arrow *d* in Fig. 3, the leg 15 being on the right hand side of the leg 18 of member B there would be no tendency for the separation of these members, especially as movement of member A to the right is prevented because it passes on the left hand side of the spoke.

It will be observed that as the legs 15 and 18 are longer than the legs 14 and 19, the securing means for the chain therefore has a part at one side of the tread of the tire nearer said tread than the part at the other side. Hence if the chain passing transversely of the tread and held by said parts were reversed end for end, a fresh or unworn portion of the chain would be at the tread. In order to increase the length of this unworn portion which comes opposite to the tread on reversal of the chain, I have provided a chain which is longer than necessary to reach between said securing parts across the tread leaving the loose ends or links 24. Hence if the chain illustrated in Fig. 1 is reversed end for end, it is clear that an entirely fresh or unworn portion would come at the tread of the tire. Consequently with this construction the life of the chain is nearly doubled. Of course this feature of securing the chain with one end thereof nearer the tread than the other can be used in connection with other types of devices for securing the chain to the tire.

In Fig. 4 a securing device is illustrated which is similar to that shown in Fig. 1 with the exception that one of the U-shaped members does not cross over the other. As shown, this modified form comprises a member bent on itself to form a bight 10' and two U-shaped members A' and B', the member A' at its middle being formed with a spoke receiving offset 11' the opposite sides 12' and 13' of which are of equal length. The leg 14' of member A' is longer than the leg 15' and near its end is formed with a bight 16' and hook 17'. The other U-shaped member B' has one leg 18' longer than the other, 19', and is arranged substantially parallel with the member A' and crosses the offset 11' near the open side thereof. The free end of the leg 19' is formed with a hook 20' which coöperates with the hook 17' to hold the free end of the legs 14' and 19' together. This securing means is adapted to have a chain attached thereto in the same manner as the form illustrated in Fig. 1 and the device is applied to a tire in the same way.

Although I have described specifically two forms of my invention, it is to be understood that I do not desire to be limited to the exact details shown but that the structure may be changed within the scope of the appended claims.

Having thus described my invention what is claimed as new and desired to be secured by Letters Patent is:

1. An anti-skid device for tires including a bar bent into a substantially U-shaped member adapted to straddle the wheel felly formed with a spoke receiving offset at its middle part and means at each end to engage in a link of a chain, a chain removably carried by said means, said bar having means integral therewith for holding the same with a spoke in said offset.

2. An anti-skid device for tires including a bar bent into a substantially U-shaped member adapted to straddle the wheel felly formed with a spoke receiving offset at its middle part and means at each end to engage in a link of a chain, a chain removably carried by said means, one leg of the U being longer than the other.

3. An anti-skid device for tires including a bar bent on itself to form a bight and two U-shaped members adapted to straddle the wheel felly one member formed with a spoke receiving offset, the other member crossing said offset adjacent the open side thereof whereby the two members are adapted to engage opposite sides of a spoke and hold the device from displacement, one member near its free end formed with a bight, the free ends of the members formed with coöperating hooks, and a chain extending between said bights.

4. An anti-skid device for tires including a bar bent on itself to form a bight and two U-shaped members adapted to straddle the wheel felly, one member formed with a spoke receiving offset one side of which is longer than the other, the other member crossing said first member adjacent the open side of said offset whereby one leg of said second member is on one side and the other leg on the opposite side of the first member the free ends of the two members formed with coöperating hooks and a chain having a link in said bight extending to and removably secured adjacent said free ends.

5. An anti-skid device for tires including a chain, and means for attaching the chain to the tire transversely of the tread, said means at one side of the tire being nearer the tread than at the other side, whereby when the chain is reversed end for end an unworn portion will be at the tread.

6. An anti-skid device for tires including a chain, and means for attaching the chain to the tire, transversely of the tread including parts at opposite sides of the tire tread, said chain being longer than the distance between said parts across the tread, one of said parts holding one end of the chain and the part on the other side of the tread adapted to engage a link of the chain which is a few links from the end thereof, whereby when the chain is reversed end for end an unworn portion will be at the tread.

7. An anti-skid device for tires including a chain and means for attaching the chain to the tire transversely of the tread including parts at opposite sides of the tire tread, the part at one side being nearer the tread than at the other, the chain being longer than the distance between said parts across the tread, the part nearer the tread engaging a link at one end of the chain and the part farther from the tread engaging a link of the chain which is a few links from the end thereof, whereby when the chain is reversed end for end an unworn portion will be at the tread.

8. An anti-skid device for tires including a bar bent on itself to form a bight and two U-shaped members adapted to straddle the wheel felly with said members on opposite sides of a spoke, means for fastening the free ends of said members together and a chain spanning the space between the ends of the legs of said members.

9. An anti-skid device for tires including a bar bent on itself to form a bight and two U-shaped members adapted to straddle the wheel felly with said members on opposite sides of a spoke, means for fastening the free ends of said members together and a chain spanning the space between the ends of the legs of said members, one pair of legs being shorter than the other pair.

In testimony whereof I affix my signature.

WILLIAM J. ASHER.